US008805158B2

(12) United States Patent  (10) Patent No.: US 8,805,158 B2
Arrasvuori et al.  (45) Date of Patent: Aug. 12, 2014

(54) VIDEO VIEWING ANGLE SELECTION

(75) Inventors: Juha Arrasvuori, Tampere (FI); Peter Eskolin, Pirkkala (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/368,815

(22) Filed: Feb. 8, 2012

(65) Prior Publication Data

US 2013/0202265 A1  Aug. 8, 2013

(51) Int. Cl.
*H04N 5/932*  (2006.01)

(52) U.S. Cl.
USPC .......................................... 386/219; 386/200

(58) Field of Classification Search
None
See application file for complete search history.

(56) References Cited

U.S. PATENT DOCUMENTS

| 7,193,645 | B1 | 3/2007 | Aagaard et al. | 348/211.3 |
|---|---|---|---|---|
| 2002/0105598 | A1 | 8/2002 | Tai et al. | 348/705 |
| 2007/0146484 | A1 | 6/2007 | Horton et al. | 348/159 |
| 2010/0157016 | A1 | 6/2010 | Sylvain | 348/14.08 |
| 2010/0157020 | A1 | 6/2010 | Choi et al. | 348/47 |
| 2010/0289900 | A1* | 11/2010 | Ortiz | 348/159 |
| 2013/0033585 | A1* | 2/2013 | Li et al. | 348/51 |

FOREIGN PATENT DOCUMENTS

EP  2328131 A2  6/2011

OTHER PUBLICATIONS

Nummiaro, K., et al., Color-Based Object Tracking in Multi-Camera Environments, Pattern Recognition, Lecture Notes in Computer Science, vol. 2781, 2003, pp. 591-599.
Teach-ICT.com; "Multiple Camera Views." http://www.teach-ict.com/as_a2_ict_new/ocr/A2_G063/334_applications_ict/digitaltv/miniweb/pg9.htm, 2012.
Wikipedia. "Red Button (digital television)." http://en.wikipedia.org/wiki/Red_Button_(digital_television), 2006.
Aarts; Barbieri; de With; Shrestha; and Weda. Philips Research Europe, 5656AE Eindhoven, The Netherlands and Eindhoven University of Technology 5600MB Eindhoven, The Netherlands. "Automatic Mashup Generation from Multiple-camera Concert Recordings" from *MM'10*, Oct. 25-29, Firenze, Italy.

* cited by examiner

*Primary Examiner* — William C Vaughn, Jr.
*Assistant Examiner* — Eileen Adams
(74) *Attorney, Agent, or Firm* — Harrington & Smith

(57) ABSTRACT

A method including identifying a plurality of common objects-of-interest in each of a plurality of videos, where each of the plurality of videos has a different viewing angle of the plurality of objects-of-interest; and automatically selecting a first one of the videos to send to a user based, at least partially, upon a selection by the user of one of the objects-of-interest.

22 Claims, 11 Drawing Sheets

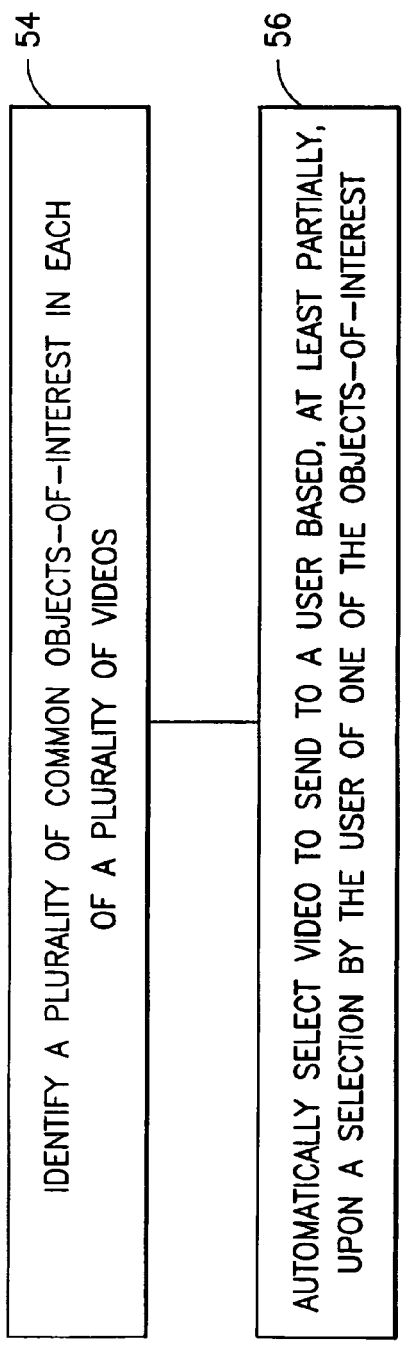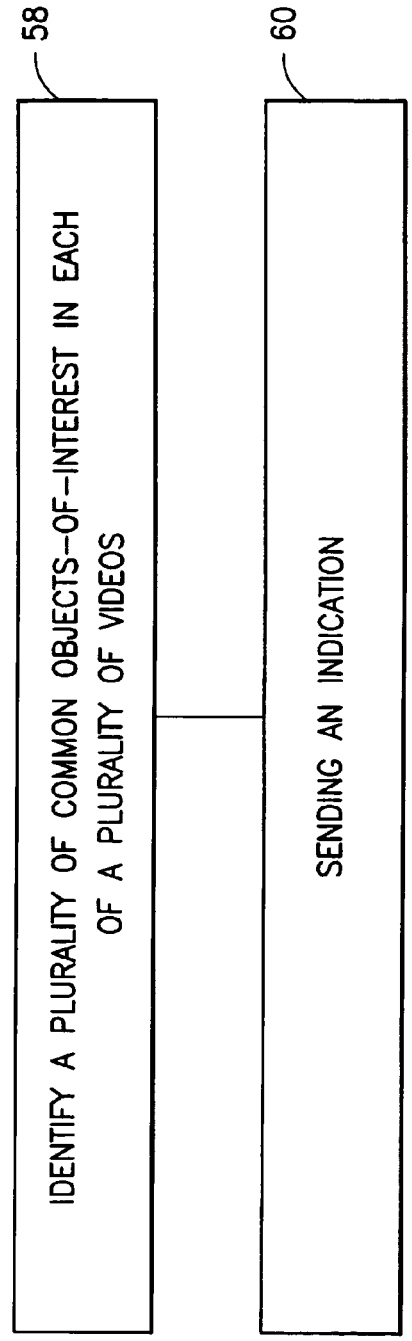

VIDEO VIEWING ANGLE SELECTION

BACKGROUND

1. Technical Field

The exemplary and non-limiting embodiments relate generally to video and, more particularly, to viewing video from different angles.

2. Brief Description of Prior Developments

An object or multiple objects can be video recorded from different angles at a same recording time, thereby creating different videos. The different videos can be used to create a presentation which uses portions of the different videos at different times.

SUMMARY

The following summary is merely intended to be exemplary. The summary is not intended to limit the scope of the claims.

In accordance with one aspect, a method comprises identifying a plurality of common objects-of-interest in each of a plurality of videos at a same or nearly a same recording time, where each of the plurality of videos has a different viewing angle of the plurality of objects-of-interest; and automatically selecting a first one of the videos to send to a user based, at least partially, upon a selection by the user of one of the objects-of-interest.

In accordance with another aspect, a method comprises identifying a plurality of objects-of-interest in a plurality of videos, where each of the plurality of videos has a different viewing angle of the plurality of objects-of-interest; and based upon a user selection of a first one of the objects-of-interest, sending an indication to the user of a possible alternative selection for viewing a second one of the videos, where the indication is shown while the user is viewing a first one of the videos, and where the indication is shown with the first video and indicates the different viewing angle relative to the first object-of-interest in the first video being viewed by the user.

In accordance with another aspect, a non-transitory program storage device is provided readable by a machine, tangibly embodying a program of instructions executable by the machine for performing operations, the operations comprising identifying a plurality of objects-of-interest in a plurality of videos, where each of the plurality of videos has a different viewing angle of the plurality of objects-of-interest; and automatically selecting one of the videos to send to a user based, at least partially, upon a selection by the user of one of the objects-of-interest.

In accordance with another aspect, a non-transitory program storage device is provided readable by a machine, tangibly embodying a program of instructions executable by the machine for performing operations, the operations comprising identifying a plurality of objects-of-interest in a plurality of videos, where each of the plurality of videos has a different viewing angle of the plurality of objects-of-interest; and based upon a user selection of a first one of the objects-of-interest, sending an indication to the user of a possible alternative selection for viewing a second one of the videos, where the indication is shown while the user is viewing a first one of the videos, and where the indication is shown with the first video and indicates the different viewing angle relative to the first object-of-interest in the first video being viewed by the user.

In accordance with another aspect, an apparatus is provided comprising a memory comprising a plurality of videos, where each of the plurality of video has a different viewing angle of a plurality of objects-of-interest; and a controller connected to the memory, where the controller is configured to identify the plurality of objects-of-interest in the plurality of videos; and automatically select one of the videos to send to a user at least partially based upon a selection by the user of a first one of the objects-of-interest.

BRIEF DESCRIPTION OF THE DRAWINGS

The foregoing aspects and other features are explained in the following description, taken in connection with the accompanying drawings, wherein:

FIG. 10 is a diagram illustrating some steps of an example method; and

FIG. 11 is a diagram illustrating some steps of an example method.

DETAILED DESCRIPTION OF EMBODIMENTS

Figure 1:
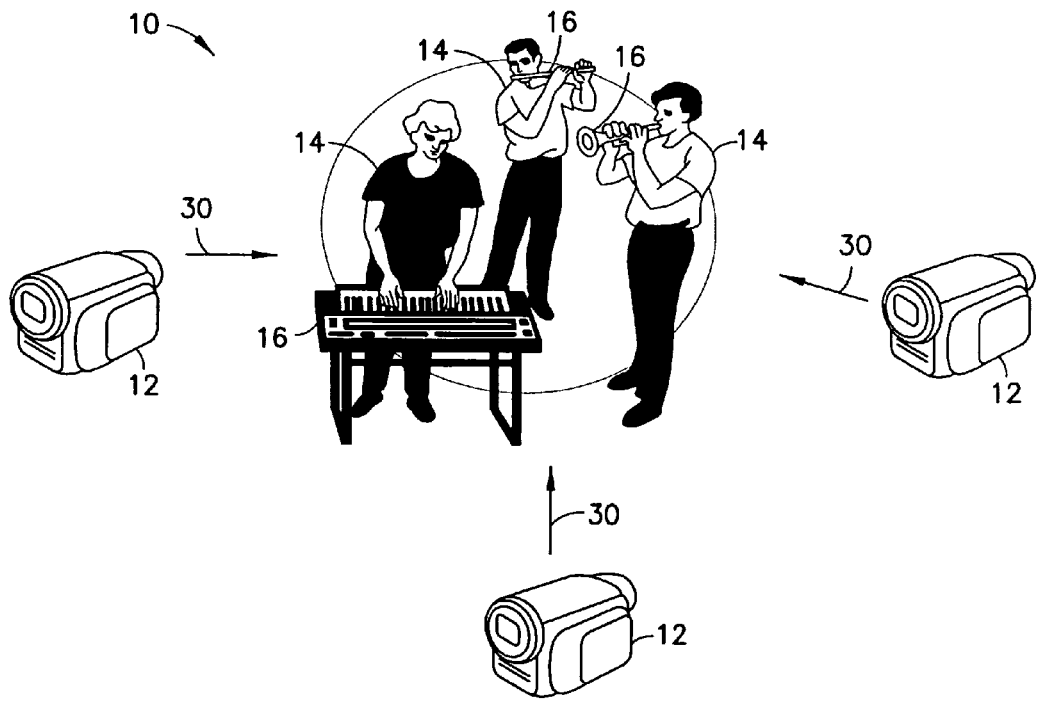
FIG. 1 is a diagram illustrating an event being recorded.

Referring to FIG. 1, an illustration is shown of an event 10 which is being recorded by recorders/cameras 12. The event 10, in this example, is a music presentation by a band comprising different members 14 playing various musical instruments 16. However, the event 10 is merely intended to be illustrative of features described herein. Other events could include, for example, a sports event, automobile traffic (such as an automobile accident) or a news event. The event could merely be passage of time being observed by security cameras and/or satellite cameras and/or cameras on manned and/or un-manned aircraft for example. The recorders/cameras 12 could be any suitable type of devices, such as television cameras, video recorders, hand-held mobile telephones having video recording capabilities, and/or the other cameras mentioned above for example.

Figure 2:
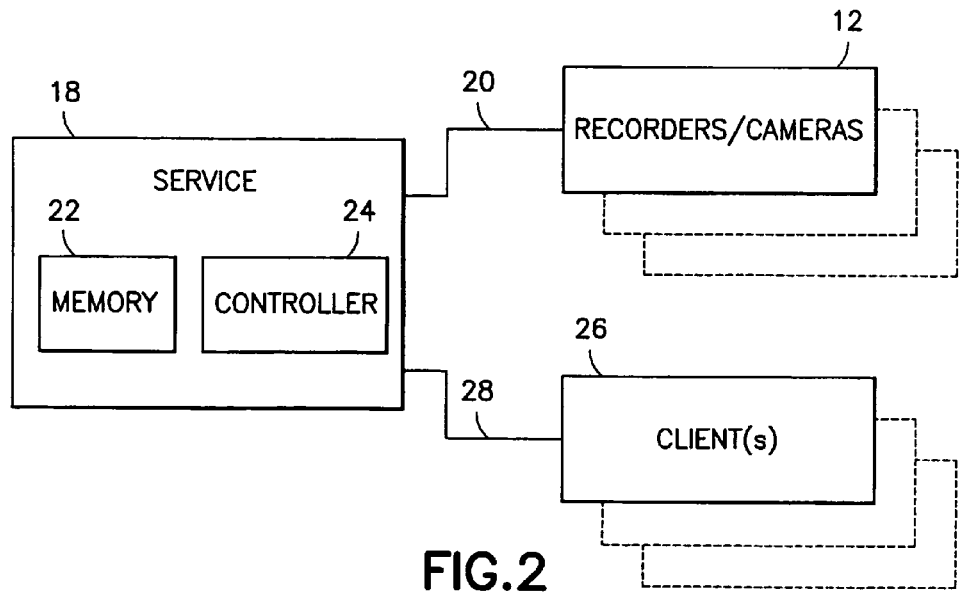
FIG. 2 is a diagram illustrating a system for features described herein.

Referring also to FIG. 2, the recorders/cameras 12 are able to transfer 20 video recordings (video) to a service 18. This transfer 20 may be during the event 10 and/or after the event 10. This transfer may be directly or indirectly, such as including a wireless connection and the Internet for example. The service 18 includes suitable hardware and software, including a memory(ies) 22 and a controller(s) 24 to store the transferred videos and perform operations regarding the videos as further described below. The controller 24 may include, for example, processors such as in server computers.

One or more clients 26 may connect to the service 18 for viewing the videos. The connection 20 can include any suitable type of connection including wireless, wired, and/or Internet for example. The client(s) 26 may comprise, for example, a home television, a computer, a mobile telephone having an Internet browser application, or any other suitable type of media player.

User(s) can use the client(s) 26 to view the videos from the service 18 via the connection 28. The recorders/cameras 12, because they are located at different positions relative to the event 10, have different viewing angles 30 of the event 10.

Features, as described herein, may be used with a video service providing automatic selection of content from multi-angle video content. Such video service may receive videos captured from multiple angles at an event, and automatically cut between each viewpoint to create a video that shows one angle at a time. Such video service may select and present content also in other ways to create an "automatic cut" of content from multiple video sources.

From multi-angle video source material, features as described herein can provide a user visual content that is relevant or customized particularly to him/her. More specifically, features can utilize multi-angle video content so that the user has control to switch to another available angle that shows a certain object-of-interest from another viewpoint. Thus, features can be used to allow the user to intuitively select between alternative video angles for an object-of-interest. Any event will have at least one object-of-interest. In the example shown in FIG. 1, the event 10 has six objects-of-interest consisting of the three members 14 of the band and the three instruments 16. In other events, more or less than six objects-of-interest may be present, and the objects-of-interest could be any suitable person or object in the video, such as a car or a hand of a person for example. Because of the different viewing angles 30, each camera 12 can record one or more of the objects-of-interest at different viewing angles. The clients 26 can be used to view the different videos, where each video has a different viewing angle of the objects-of-interest.

The service 18 can analyze multiple videos captured at an event for identifying objects-of-interest in the videos. For example, if a guitarist appears in six out of the ten different video angles, then the service 18 may determine the guitarist to be a potential object-of-interest. This analysis may be done "on the fly" for live broadcasted material, or after the event when videos of the different angles have been uploaded to the service.

Figure 3:
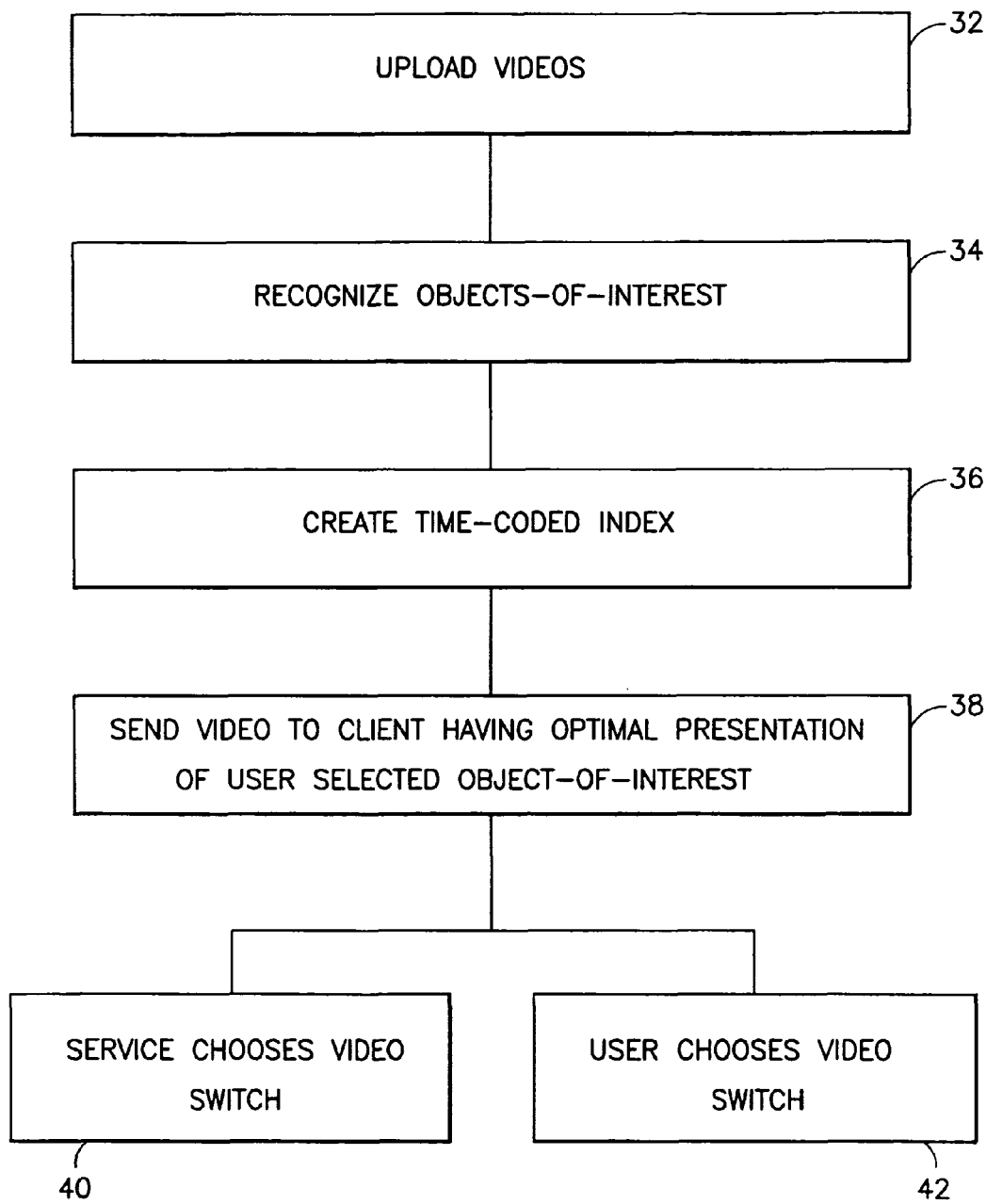
FIG. 3 is a diagram illustrating some steps of an example method.

Referring also to FIG. 3, multiple recorders/cameras 12 capture video at an event 10 and upload 32 their videos to the service 18. As illustrated by block 34, the service 18 recognizes objects-of-interest. Alternatively, the objects-of-interest may also be defined manually by the persons operating or monitoring the cameras. As illustrated by block 36, the service 18 in this example creates a time-coded index of the identified potential objects-of-interest, that defines the video sources which an object appears in, and its position within the frame of each video source. Through this index, the service can reference in which angles (individual videos) every object-of-interest appears in, and at what times (we have to remember that each video may not be an uninterrupted recording of the event). With the videos time-coded, and containing heading (vantage point) information in their metadata, the service 18 can determine how the videos are related in time and space. Features may be utilized in both viewing a live broadcast from the event, as well as for rendering after the event a customized "automatic cut" version from the event material for each user based on his selection of an object-of-interest.

Features may comprise allowing a user to select one of the objects-of-interest, such as through a touch screen on a client 26 for example. The objects-of-interest that can be selected by the user are limited to those recognized by the service when analyzing the video, so the user cannot click on any object in the video and define it as his object-of-interest unless previously recognized by the service as one of the potential objects-of-interest.

In a first example embodiment, the service initially selects the video angle to be shown to the user based on optimal presentation of the all defined objects-of-interest. In other words, that video angle is presented which best shows all the user-selectable objects-of-interest.

The service and client allows the user to select an object-of-interest when viewing a presentation created by a service from multi-angle video source material. For a touch screen on the client 26 for example, the user might merely press on an object-of-interest (such as a lead singer of a band performance for example). The touch screen selection can then be transmitted to the service 18 as the object-of-interest to be used for the user's customized multi-video presentation. As illustrated by block 38, the videos are cut by the service to show one video angle at a time, but the angle (video) is chosen to optimally present the selected object-of-interest. As described in one example below, the service 18 can automatically switch videos to send to the client when another video has a better presentation of the selected object-of-interest. The user may select a new object-of-interest while viewing the video.

The video service 18 can synchronize all the individual videos based on their time-codes. For all source videos at a certain point in time (e.g. every frame), the video service determines which objects-of-interest there are in all of the angles. The video service then lists the identified objects-of-interest into a description that defines each object-of-interest and its location within the frame of each video angle it appears in (this information is used to provide the interactive area in the client).

While streaming the video to multiple clients, the video service analyzes every camera angle and identifies possible objects-of-interest in them. The objects-of-interest may be a person or an object or a landmark for example. The video service may send descriptions or indications of these objects-of-interest to each client viewing the video; their location on the screen in the currently shown video for example.

A user following the broadcast can select an object-of-interest (e.g. the guitarist or lead singer), in the broadcast by clicking on that object, such as on a touch screen of the client for example. These "clickable areas" can be provided to the client by the service. Based on the selection by the user, the video service chooses which video angle to transmit to the user. The initial video angle may be chosen from multi-angle source content so that the defined object-of-interest is given the best presentation (e.g. it appears largest in frame).

What follows next, can include one of two embodiments (or a combination of them). In a first example, as illustrated by block 40, the service 18 chooses the optimal angle for the defined object-of-interest. After defining the current object-of-interest, no more input is required by the user. Thereafter, the primary selection criteria for the video service to choose the video angle to be broadcasted to the user (whenever there is a change to be made in the angle) may be the optimal appearance of the selected object-of-interest for example. As another example, a new video angle may be chosen based on criteria such as camera steadiness or visual clarity for example. During viewing of the video, the user may select another object-of-interest by clicking on it directly or an area representing it. This may cause the service to change the selection of the camera angle, now based on the new user selected object-of-interest.

In a second embodiment, the user may also select alternative angles showing the defined object-of-interest; even if not the optimum presentation of the object-of-interest. In this second embodiment a visual indication is given to the user about the availability and approximate vantage point of the alternative angles in relation to the defined object-of-interest. In one example, initially the video service 18 begins to stream a broadcast of an event that has been recorded (or is being captured live) by multiple cameras. The basic idea is that users at each client 26 are sent one camera angle at a time from the video service with information for the client to allow the user to change the camera angle. The video service may select the camera angles that are initially shown to each user. The various alternative video angles are from the same point in time of the recorded event as the video shown on the client.

Figure 4:
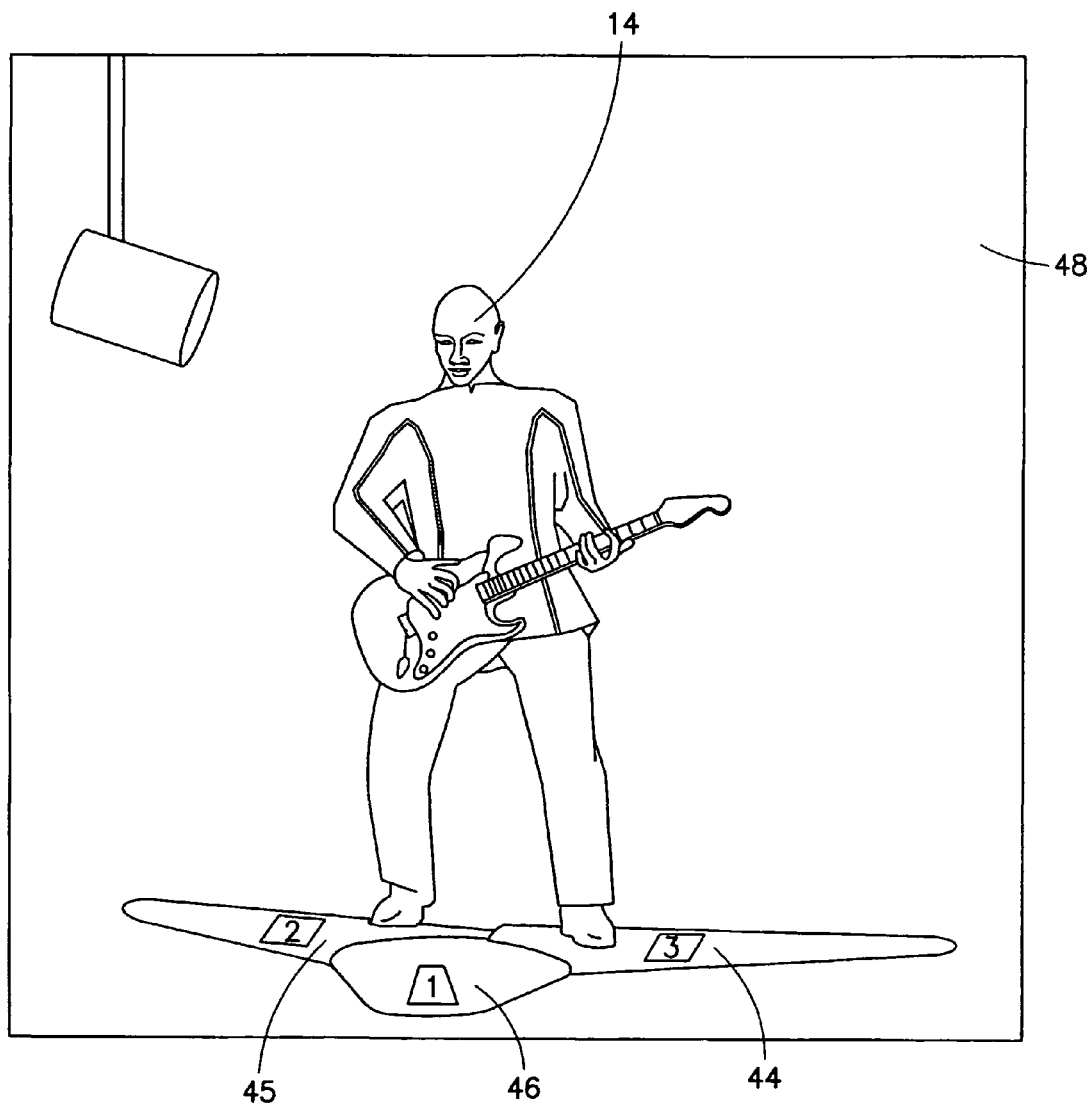
FIG. 4 is an illustration of an example image shown on a display of one of the clients shown in FIG. 2.
Figure 4A:
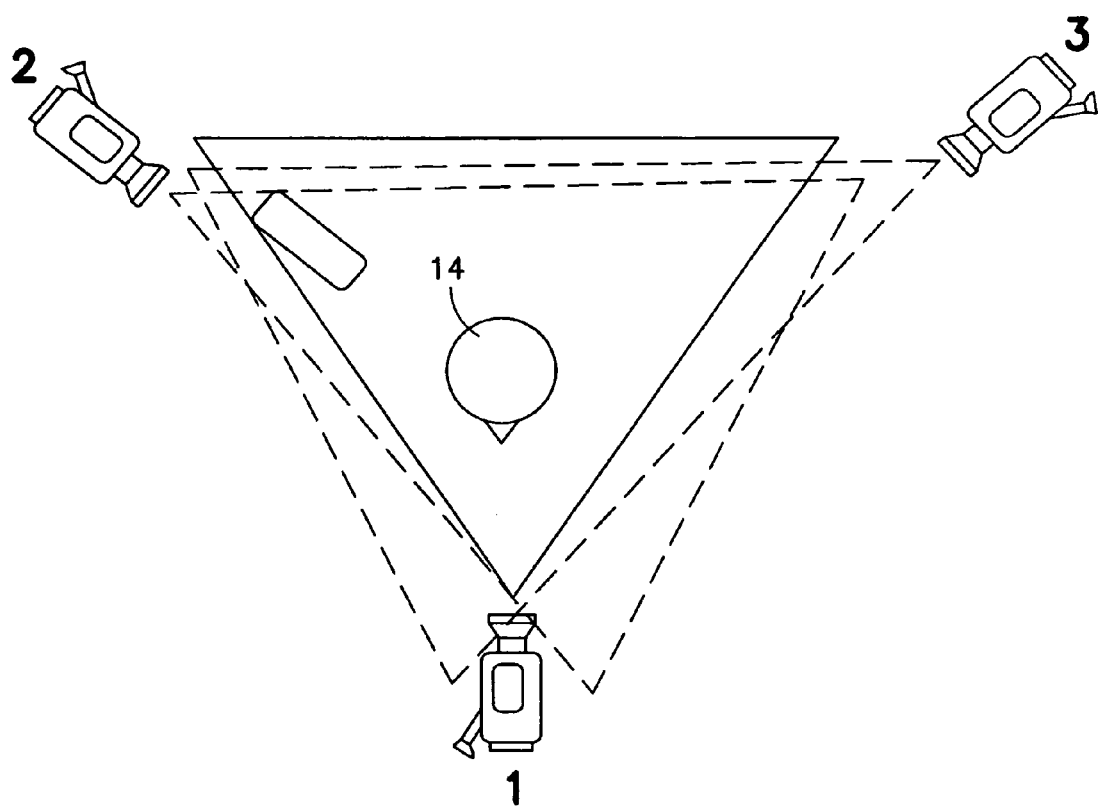
FIG. 4A is a top plan view of cameras recording the object-of-interest shown in FIG. 4.

In the second embodiment, as illustrated by block 42 the user can alternatively or additionally change the angle for the current user selected object-of-interest. After defining the current object-of-interest, the client can request from the service information about where the selected object-of-interest appears in the other available multiple video angles. Referring also to FIG. 4, based upon this request and information subsequently supplied by the service 18, the client can present these locations as clickable interactive areas 44, 45 on the display 48 for the user. For example, as shown in FIG. 4 the clickable interactive areas may be presented as polygons around the object-of-interest 14 in the video on the display 48. The position of a polygon suggests to the user the position (vantage point) of the alternative video angle in relation to the current vantage point 46, such as on the left-right axis in the example shown. When the user clicks on one of the areas 44, 45, a notification is sent to the video service to change to another video angle.

The service can send information to the client/user about the alternative video angles that are available for the currently chosen object-of-interest. The client presents, within the video, active areas that allow the user to select an alternative angle. Two alternative visualizations of the active areas are described, but any suitable visualizations could be provided. The active areas visually suggest the vantage point that an alternative angle has to the object-of-interest.

Figure 4B:
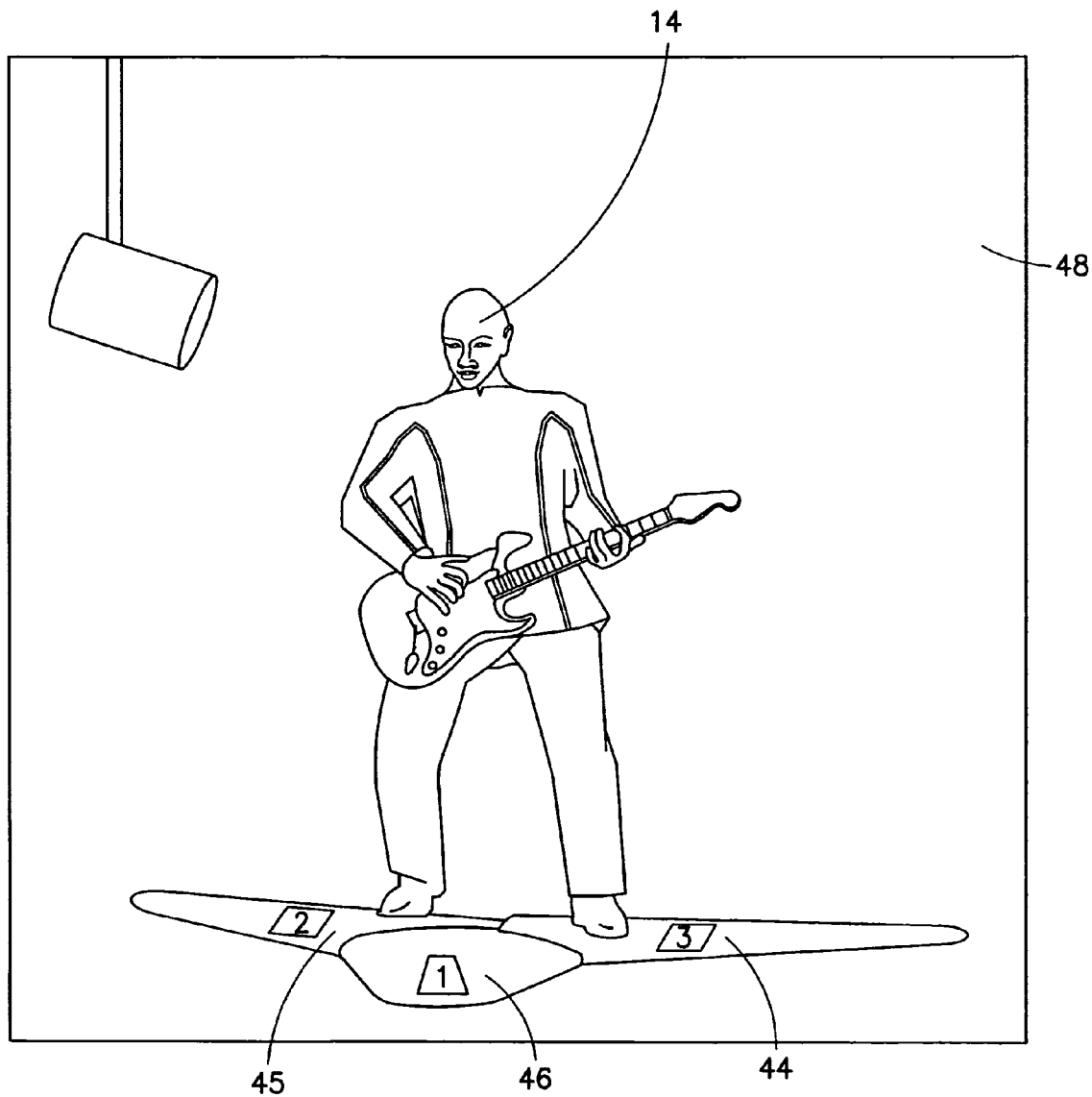
FIG. 4B is an illustration similar to FIG. 4 showing the camera angles from the cameras shown in FIG. 4A.
Figure 5:
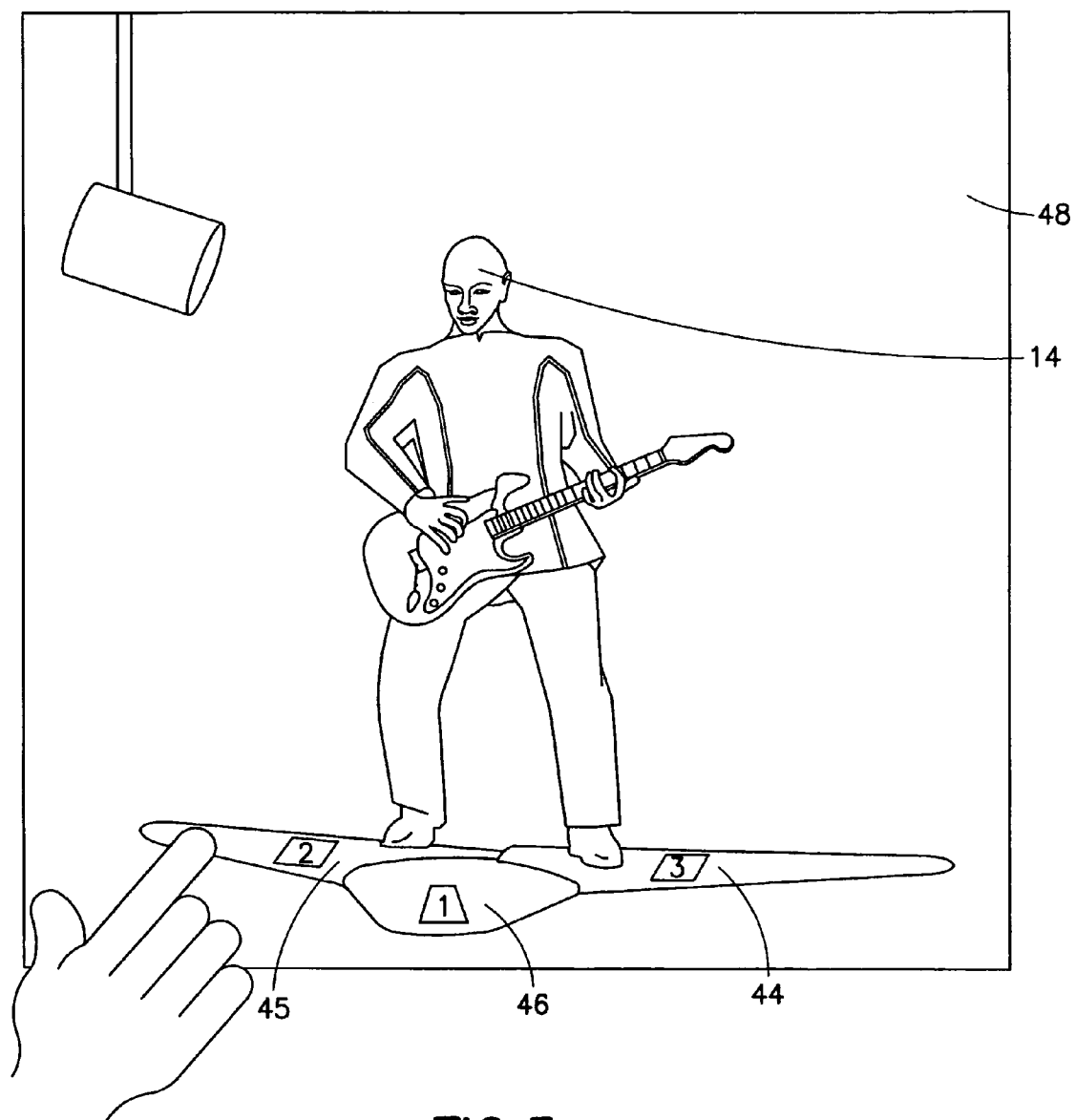
FIG. 5 is an illustration similar to FIG. 4 showing a user selecting one of the alternate angle selection areas.
Figure 6:
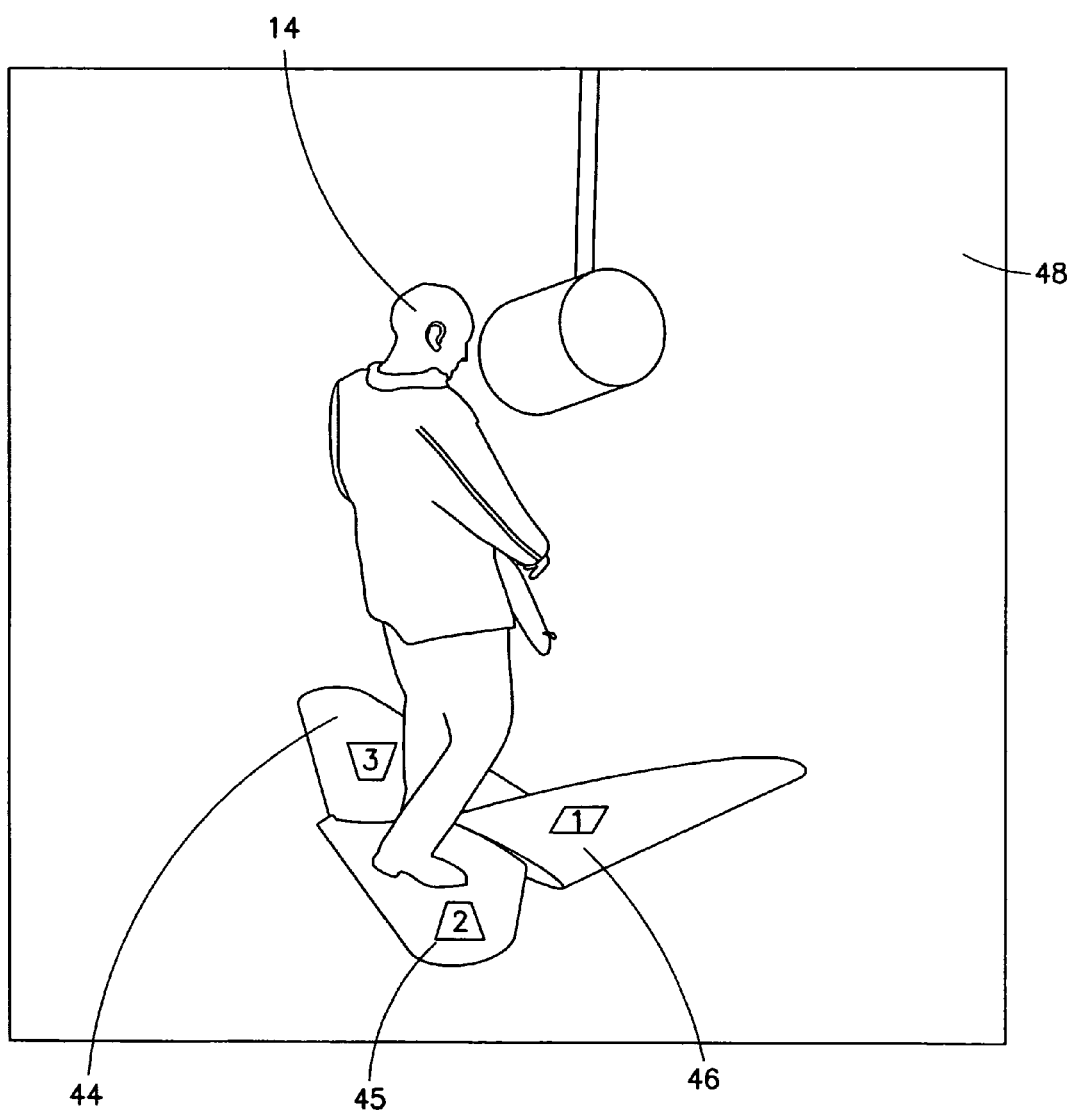
FIG. 6 is an illustration similar to FIG. 4 showing the video from the different camera angle from camera 2.
Figure 7:
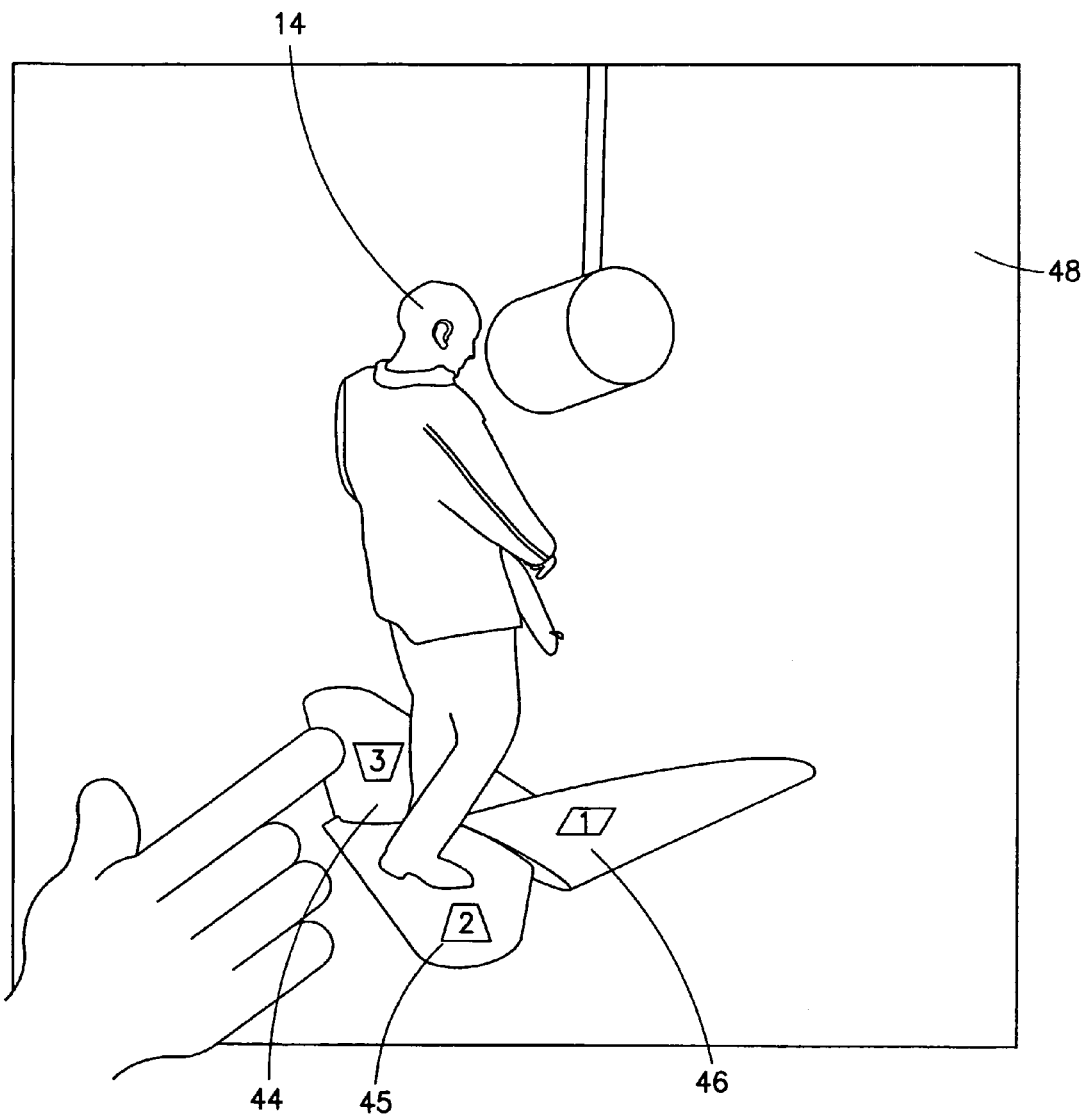
FIG. 7 is an illustration similar to FIG. 4 showing a user selecting another one of the alternate angle selection areas.
Figure 8:
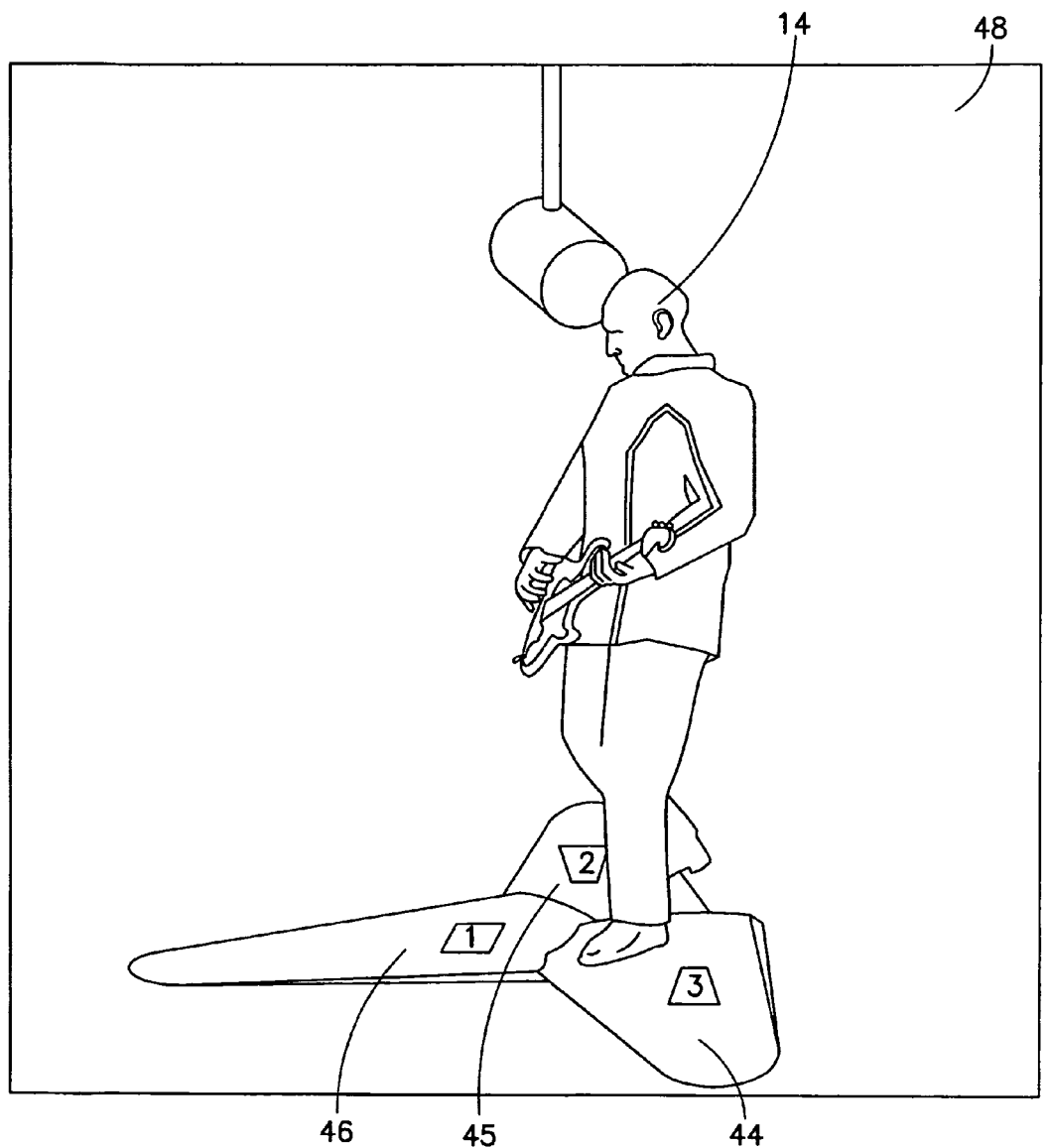
FIG. 8 is an illustration similar to FIG. 4 showing the video from the different camera angle from camera 3.

Referring also to FIGS. 4 and 4B, the areas 46, 45 and 44 correspond to the videos taken by cameras 1, 2 and 3 respectively. Referring also to FIG. 5, such as when the display 48 is a touch screen, when the user presses on the area 45, the service 18 changes the video sent to the client to a second different video having a different angle, but a same time (or substantially same) time as illustrated by FIG. 6. Referring also to FIG. 7, when the user presses on the area 44, the service 18 changes the video sent to the client to a third different video having a different angle, but a same time (or substantially same) time as illustrated by FIG. 8. The availability of the alternative videos showing an object-of-interest may change rapidly, so the service may need to send the availability information to the client often.

Figure 9:
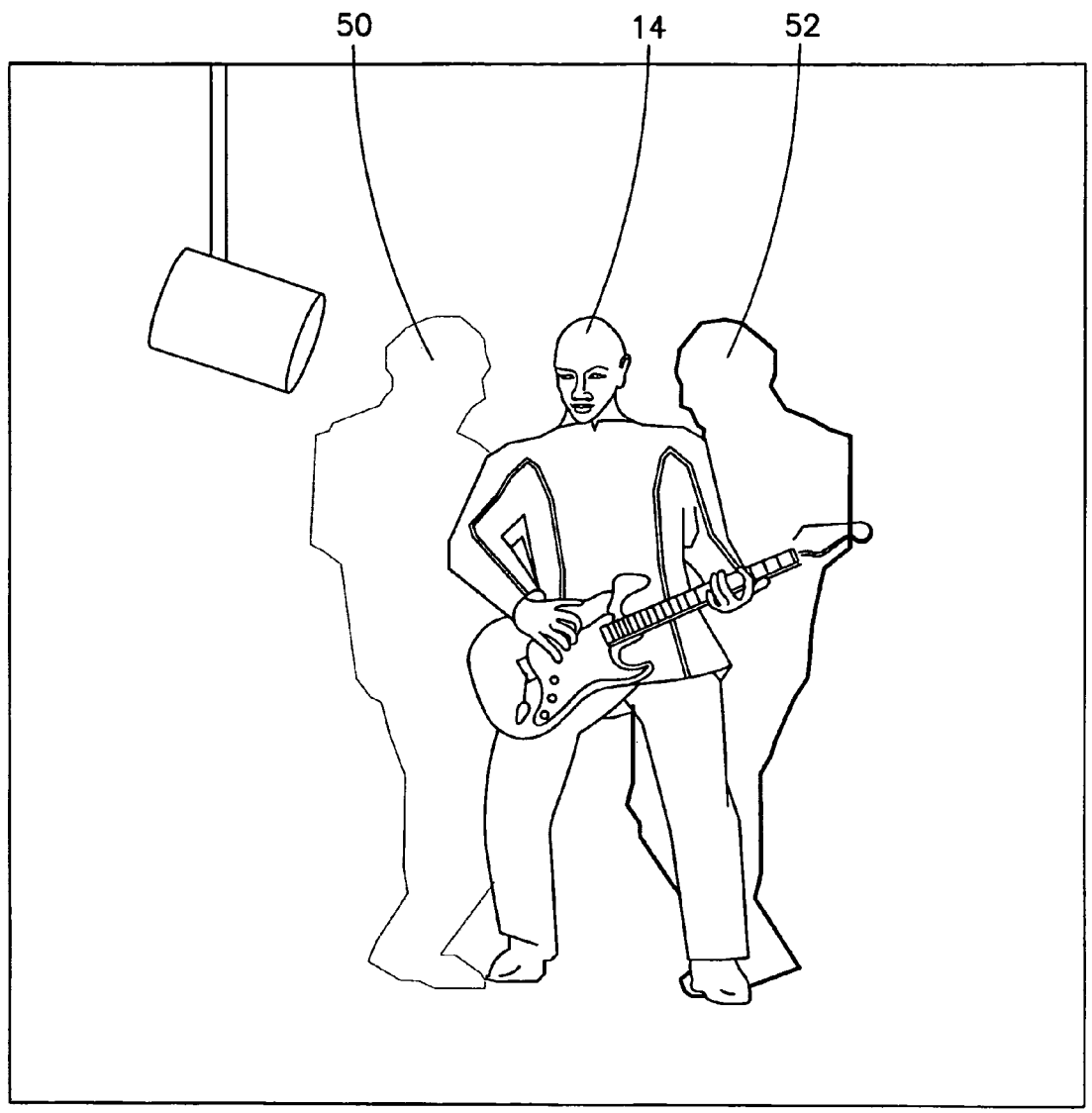
FIG. 9 is an illustration showing an alternative indication of camera angle videos available for an object-of-interest.

In addition to the general polygon shapes, other methods are possible to present the interactive areas. For example, referring also to FIG. 9, the interactive areas for selecting an alternative camera angle can be shown as "ghost-shapes" 50, 52 around the object-of-interest. The "ghost-shape" 50, 52 may be derived from the contour of the object-of-interest in the alternative angle, and re-sized to match the size of the object-of-interest in the current angle for example. The position of the "ghost-shape" can suggest visually the vantage point of the alternative angle. The interface should offer the user an easy way to switch these ON and OFF. The "ghost-shape" derived from the alternative angle may be shown near the corresponding shape in the currently shown angle. However, when cutting to the alternative angle, the object-of-interest may be located in a different part of the video frame and in a different size than in the previous angle. If there are several alternative angles available to an object-of-interest, the system may show interactive areas to only a couple of these in order not to display too many interactive visual elements. Yet another method to present the interactive areas is to make a miniature-size version (also known as "thumbnail") of the interactive area by cropping and resizing the video from each alternative angle. These thumbnails may be presented, for example, at the bottom of the display. Clicking on a thumbnail could make a cut to this video angle.

The functionality of the second embodiment 42 may also be implemented as a "stand-alone" feature. Each individual video captured at an event may be first synchronized through their audio tracks, time-codes provided by the capturing device, etc. Unusable segments of the video material, such as containing a shaking camera, may be excluded from the material pool. Each video may be analyzed synchronically to determine the same object-of-interest (such as the guitarist, the saxophone player, or the drummer for example) in each of the video angles. Typically, there may be several objects-of-interest in a video of an event such as a concert.

A first "automatic cut" version showing one angle at a time may be created of the material. Information about the alternative angles for each recognized object-of-interest may be embedded in the video broadcast from the service. The client, for viewing the video broadcast, may present the information about the alternative angles as interactive areas around each object-of-interest. Through this interactive area, the user can define the video presentation to cut to another angle showing the object-of-interest. Thus, the user's interaction creates a departure from the initial "automatic cut" version.

In the example described above with respect to FIGS. 4-8, the user can control the interactive area (e.g. by clicking on the area 44, 45 left or right of the area 46) causing the service to select an angle (such as the video having angle from camera 2 or the video having angle from camera 3) from the current angle 46 from camera 1 to the object-of-interest 14. In another example, the user can choose this "cut direction" or angle by twisting the client 26 on a flexible device (orientation or motion sensor in the client 26 being used) or with some other controller. The user can alternate between the cuts (i.e. different angles) of the same object-of-interest or some other object-of-interest. By pressing a button or perhaps a virtual button/icon, the presentation may return to the initial "automatic cut" version.

Features describe herein may provide the advantages of giving a user the power to define an object-of-interest, and a personal automatically edited version may be cut for the user to optimally show the object-of-interest. Further, features allow the user to easily define a cut between alternative angles of an object-of-interest.

Referring also to FIG. 10, one example method comprises identifying a plurality of common objects-of-interest in each of a plurality of videos as indicated by block 54, where each of the plurality of videos has a different viewing angle of the plurality of objects-of-interest; and automatically selecting a first one of the videos to send to a user based, at least partially, upon a selection by the user of one of the objects-of-interest as illustrated by block 56.

The method may further comprise automatically selecting a second one of the videos to send to the user based, at least partially, upon a selection by the user of one of the objects-of-interest, and based at a different common time of the videos. The plurality of videos have an at least partially common time when recorded. Automatically selecting the first video to send to the user may be based, at least partially, upon a predetermined picture characteristic of the user selected object-of-interest in the first video versus the predetermined picture characteristic of the user selected object-of-interest in another one of the videos. The predetermined picture characteristic may be size of the user selected object-of-interest in the frame for example, or focus of the user selected object-of-interest in the frame for example. The method may further comprise automatically switching selection of the video to send to the user based, at least partially, upon the selection by the user of one of the objects-of-interest, and upon a predetermined picture characteristic of the user selected object-of-interest in the videos. The method may further comprise, based upon the user selection of the first object-of-interest, sending an indication, such as 44, 45, 50, 52 for example, to the user of a possible alternative selection for viewing a second one of the videos, where the indication is shown while the user is viewing the first video, and where the indication is shown with the first video and indicates the different viewing angle relative to the first object-of-interest in the first video being viewed by the user. The indication may be a direction marker 44, 45 shown relative to the first object-of-interest. The indication is a contour 50, 52 of the object-of-interest from the different viewing angle. Multiple ones of the indication may be shown on the first video respectively corresponding to the second video and a third video with another different viewing angle. Sending the indication may be dependent upon receiving a request from the user for the indication.

Referring also to FIG. 11, another example method comprises identifying a plurality of objects-of-interest in a plurality of videos as illustrated by block 58, where each of the plurality of videos has a different viewing angle of the plurality of objects-of-interest as illustrated by block 58; and based upon a user selection of a first one of the objects-of-interest, sending an indication to the user of a possible alternative selection for viewing a second one of the videos as indicated by block 60, where the indication such as 44, 45 or 50, 52 is shown while the user is viewing a first one of the videos, and where the indication is shown with the first video and indicates the different viewing angle relative to the first object-of-interest in the first video being viewed by the user.

Sending the indication may be dependent upon receiving a request from the user for the indication. Sending the indication may send at least one other indication of another possible alternative selection for viewing other ones of the videos, where all of the indications are shown with the first video and indicate the different viewing angles relative to the first object-of-interest in the first video being viewed by the user. The indication may be a direction marker shown relative to the first object-of-interest indicating direction of the different viewing angle relative to the first object-of-interest. The indication may be a contour of the object-of-interest from the different viewing angle. Multiple ones of the indication may be shown on the first video respectively corresponding to the second video and at least one other one of the videos with different viewing angles. The audio track presented by a client may be continuously from one of the camera sources, from the currently viewed camera source, a mix of audio from multiple cameras, and/or from an external audio source connected to the service, such as a mixing board at the event site.

In one type of example, a non-transitory program storage device, such as a CD-ROM, memory 22 or a flash memory module for example, readable by a machine may be provided, tangibly embodying a program of instructions executable by the machine for performing operations, the operations comprising identifying a plurality of objects-of-interest in a plurality of videos, where each of the plurality of videos has a different viewing angle of the plurality of objects-of-interest; and automatically selecting one of the videos to send to a user based, at least partially, upon a selection by the user of one of the objects-of-interest.

In one type of example, a non-transitory program storage device, such as a CD-ROM, memory 22 or a flash memory module for example, readable by a machine may be provided, tangibly embodying a program of instructions executable by the machine for performing operations, the operations comprising identifying a plurality of objects-of-interest in a plurality of videos, where each of the plurality of videos has a different viewing angle of the plurality of objects-of-interest; and based upon a user selection of a first one of the objects-of-interest, sending an indication to the user of a possible alternative selection for viewing a second one of the videos, where the indication is shown while the user is viewing a first one of the videos, and where the indication is shown with the first video and indicates the different viewing angle relative to the first object-of-interest in the first video being viewed by the user.

In one example, an apparatus 18 comprises a memory 22 comprising a plurality of videos, where each of the plurality of video has a different viewing angle of a plurality of objects-of-interest; and a controller 24 connected to the memory, where the controller is configured to identify the plurality of objects-of-interest in the plurality of videos; and automatically select one of the videos to send to a user at least partially based upon a selection by the user of a first one of the objects-of-interest.

The controller 24 may be configured, based upon the user selection of the first object-of-interest, to send an indication to the user of a possible alternative selection for viewing a second one of the videos, where the indication is shown while the user is viewing the first video, and where the indication is shown with the first video and indicates the different viewing angle relative to the first object-of-interest in the first video being viewed by the user. The apparatus 18 may comprise means for automatically switching selection of the video to send to the user based, at least partially, upon the selection by the user of the first object-of-interest and upon a predetermined picture characteristic of the user selected object-of-interest in the videos.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:

for each of a plurality of individual separate videos:

identifying one or more objects-of-interest as individual separate objects-of-interest in each of the individual separate videos, where a first one of the videos has at least two of the individual separate objects-of-interest identified in the first video at a same time, where at least one of the identified individual objects-of-interest are common to each one of the videos, and
where each of the plurality of the videos has a different viewing angle of the at least one identified objects-of-interest; and
automatically selecting one of the videos to send to a user based, at least partially, upon a selection by the user of at least one of the identified individual objects-of-interest.

2. A method as in claim 1 further comprising automatically selecting a second one of the videos to send to the user based, at least partially, upon a selection by the user of one of the objects-of-interest, and based at a different common time of the videos.

3. A method as in claim 1 where the plurality of videos have an at least partially common time when recorded.

4. A method as in claim 1 where automatically selecting the first video to send to the user is based, at least partially, upon a predetermined picture characteristic of the user selected object-of-interest in the first video versus the predetermined picture characteristic of the user selected object-of-interest in another one of the videos.

5. A method as in claim 1 further comprising automatically switching selection of the video to send to the user based, at least partially, upon the selection by the user of the one or more of the objects-of-interest, and upon a predetermined picture characteristic of the user selected object-of-interest in the videos.

6. A method as in claim 1 further comprising, based upon the user selection of the one or more individual object-of-interest, sending an indication to the user of a possible alternative selection for viewing a second one of the videos, where the indication is shown while the user is viewing the first video, and where the indication is shown with the first video and indicates the different viewing angle relative to the one or more object-of-interest in the first video being viewed by the user.

7. A method as in claim 6 where the indication is a direction marker shown relative to the one or more object-of-interest.

8. A method as in claim 6 where the indication is a contour of the one or more object-of-interest from the different viewing angle.

9. A method as in claim 6 where multiple ones of the indication are shown on the first video respectively corresponding to the second video and a third video with another different viewing angle.

10. A method as in claim 6 where sending the indication is dependent upon receiving a request from the user for the indication.

11. A method as in claim 1 where identifying the two or more individual objects-of-interest comprises a person operating or monitoring a camera, which takes at least one of the videos, manually defining at least one of the objects-of-interest.

12. A method comprising:
for each of a plurality of individual separate videos, identifying at least two objects-of-interest as separate individual objects-of-interest in the video, where at least one of the identified individual objects-of-interest is common to each one of the videos, where each one of the plurality of the videos has a different viewing angle of the at least one common objects-of-interest; and
sending an indication to the user of a possible alternative selection for viewing a second one of the videos, where the indication is shown while the user is viewing a first one of the videos, and where the indication is shown with the first video and indicates the different viewing angle relative to the at least one identified individual object-of-interest in the first video being viewed by the user.

13. A method as in claim 12 where sending the indication is dependent upon receiving a request from the user for the indication.

14. A method as in claim 12 where sending the indication sends at least one other indication of another possible alternative selection for viewing other ones of the videos, where all of the indications are shown with the first video and indicate the different viewing angles relative to the at least two individual object-of-interest in the first video being viewed by the user.

15. A method as in claim 12 where the indication is a direction marker shown relative to the at least two individual object-of-interest indicating direction of the different viewing angle relative to the object-of-interest.

16. A method as in claim 12 where the indication is a contour of the at least two object-of-interest from the different viewing angle.

17. A method as in claim 12 where multiple ones of the indication are shown on the first video respectively corresponding to the second video and at least one other one of the videos with different viewing angles.

18. A non-transitory program storage device readable by a machine, tangibly embodying a program of instructions executable by the machine for performing operations, the operations comprising:
for each of at least two individual separate videos, where each of the videos comprises a plurality of individual objects-of-interest, identifying two or more of the objects-of-interest in each of the videos as separate individual objects-of-interest, where the two or more identified individual objects-of-interest are common to each one of the at least two videos, where each of the videos has a different viewing angle of the two or more objects-of-interest; and
automatically selecting one of the videos to send to a user based, at least partially, upon a selection by the user of at least one of the identified objects-of-interest.

19. A non-transitory program storage device readable by a machine, tangibly embodying a program of instructions executable by the machine for performing operations, the operations comprising:
for each of at least two individual separate videos, where each of the videos comprise a plurality of individual objects-of-interest, identifying at least two of the objects-of-interest as separate objects-of-interest in the videos, where at least one of the separate objects-of-interest in each respective video is common to each one of the at least two videos, where each of the videos has a different viewing angle of the at least one common object-of-interest; and
sending an indication to the user of a possible alternative selection for viewing a second one of the videos, where the indication is shown while the user is viewing a first one of the videos, and where the indication is shown with the first video and indicates the different viewing angle relative to the at least one common object-of-interest in the first video being viewed by the user.

20. An apparatus comprising:
a memory comprising a plurality of individual separate videos, where each of the videos comprises two or more separate individual objects-of-interest, where at least two of the videos comprise at least one of the individual objects-of-interest which is common to each one of the at least two videos, where each of the at least two videos has a different viewing angle of the at least one common object-of-interest; and a controller connected to the memory, where the controller is configured to:

identify at least two of the objects-of-interest to be separate from one another, where the identified separate objects-of-interest are common in each one of the at least two videos; and automatically select one of the videos to send to a user at least partially based upon a selection by the user of at least one of the identified separate objects-of-interest.

21. An apparatus as in claim 20 where the controller is configured, based upon the user selection of the at least one object-of-interest, to send an indication to the user of a possible alternative selection for viewing a second one of the videos, where the indication is shown while the user is viewing the first video, and where the indication is shown with the first video and indicates the different viewing angle relative to the at least one object-of-interest in the first video being viewed by the user.

22. An apparatus as in claim 20 comprising means for automatically switching selection of the video to send to the user based, at least partially, upon the selection by the user of the first object-of-interest and upon a predetermined picture characteristic of the user selected object-of-interest in the videos.

* * * * *